(12) United States Patent
Mine

(10) Patent No.: US 6,182,240 B1
(45) Date of Patent: Jan. 30, 2001

(54) REPRODUCTION SYSTEM, REPRODUCTION APPARATUS AND REPRODUCTION METHOD FOR DEFECT MANAGEMENT

(75) Inventor: Norichika Mine, Kanagawa (JP)

(73) Assignee: Sony Corporation, Tokyo (JP)

( * ) Notice: Under 35 U.S.C. 154(b), the term of this patent shall be extended for 0 days.

(21) Appl. No.: 09/020,723

(22) Filed: Feb. 9, 1998

(30) Foreign Application Priority Data

Feb. 12, 1997 (JP) .................................................. 9-027793

(51) Int. Cl.[7] .......................................................... H04L 1/22
(52) U.S. Cl. ...................................................... 714/5; 714/8
(58) Field of Search .................................. 714/5, 7, 8, 42

(56) References Cited

U.S. PATENT DOCUMENTS

| | | | |
|---|---|---|---|
| 5,111,444 | * 5/1992 | Fukushima et al. | 369/58 |
| 5,737,639 | * 4/1998 | Ohmori | 395/893 |
| 5,953,513 | * 9/1999 | Saiki et al. | 395/500 |
| 5,974,544 | * 10/1999 | Jeffries et al. | 713/1 |

* cited by examiner

Primary Examiner—Thomas C. Lee
Assistant Examiner—Nitin Patel
(74) Attorney, Agent, or Firm—Limbach & Limbach L.L.P.; Seong-Kun Oh

(57) ABSTRACT

A reproduction system includes a host apparatus and a reproduction apparatus for executing a reproduction operation with respect to a predetermined recording medium, both connected so as to mutually communicate. Defect management information is read from the recording medium for necessary address transformation so that the host apparatus can perform the defect management of the recording medium. When requesting the reproduction apparatus to reproduce data, the host apparatus transmits to the reproduction apparatus, physically-reading position information formed by performing address transformation in accordance with the defect management condition. The reproduction apparatus does not need to perform defect management when reproducing data from a read only medium but also a random access medium. This enables provision of a reproduction apparatus capable of using the random access memory medium, with the similar circuit size and cost of a reproduction apparatus adapted for only the read only medium.

31 Claims, 10 Drawing Sheets

FIG. 4A-1
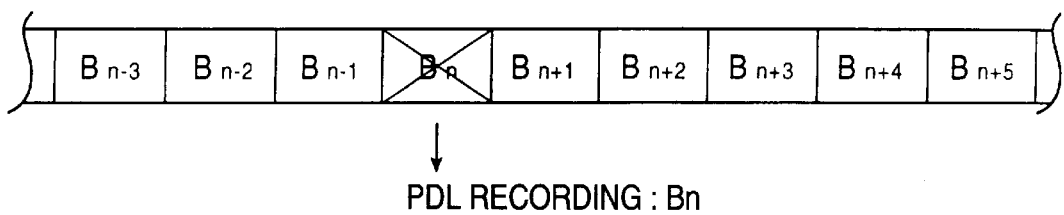
PDL RECORDING : Bn
FIG. 4A-2
FIG. 4B-1
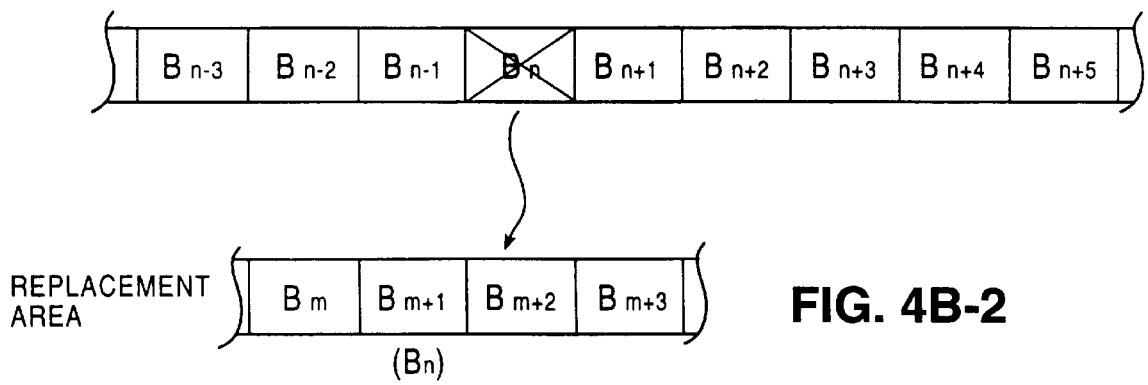
FIG. 4B-2
SDL RECORDING : Bn, Bm+2

REPRODUCTION SYSTEM, REPRODUCTION APPARATUS AND REPRODUCTION METHOD FOR DEFECT MANAGEMENT

BACKGROUND OF THE INVENTION

1. Field of the Invention

The present invention relates to a reproduction system including, for example, a reproduction apparatus (disc drive) capable of performing a reproduction operation with respect to a disc recording medium, and a host device (e.g., computer having a disc driver function) connected to the reproduction apparatus so as to direct it to perform reproduction. More the present invention also relates to a reproduction method thereof.

2. Description of the Related Art

Compact discs (CDs) such as optical-disc recording media have come into wide use, and CD-system discs are used in various fields. In particular, compact disc read only memories (CD-ROMs), compact disc recordables (CD-Rs), and so forth, are widely used for computers.

In addition, discs called "digital versatile discs" or "digital video discs" (DVDs) suitable for multimedia use have been developed. The DVDs are adapted for various types of data such as video data, audio data and computer data. Although the DVDs have a size (diameter of 12 cm) equal to that of a CD, they have a storage capacity which is remarkably increased by using a smaller-pitch recording-track formation, data compression techniques.

The DVDs include types such as digital versatile disc read only memories (DVD-ROMs) used only for reproduction, digital versatile disc rewritables (DVD-Rs) capable of being rewritten once, and digital versatile disc random access memories (DVD-RAMs).

It has been proposed that the DVD-RAM media use a replacement processing for defect management since they have a random access function.

In other words, when a defective region is found by checking a disc while the disc is being formatted or used, the defective region is assigned to another region. Subsequently, information on the defective region and information on the assignment region are recorded as defect management information (defect map) in a particular area on the disc.

When an actual reproduction request is generated, a logical address as to the request is transformed to the physical address corresponding to a real address on the disc. If the logical address includes a portion corresponding to the defective region managed with the defect management information, an address where an actual reading operation is performed must be generated by executing the step of transforming only the address of the defective portion to the address of a replacement region.

Conversely, the DVD-ROM media do not need defect management including such a replacement process.

The structure of a DVD drive (DVD reproduction apparatus) will be described. If the reproduction apparatus is adapted for only a DVD-ROM, the reproduction apparatus needs no defect management function. Accordingly, when a reproduction request is sent from the host computer, all that is required is the function of transforming to a physical address a logical address as reproduction-position information sent from the host computer connected to the reproduction apparatus. In general, logical addresses are such that the beginning of the user area of a disc is used as the start (address zero). Physical addresses are addresses, numbered from the start, including a control information area formed before the user area. Thus, transforming the logical address to the physical address simply needs offset addition which adds to the logical address an address value before the user area, which eliminates the need for using relatively large firmware for providing the function of transforming the logical address to the physical address. Accordingly, a reproduction apparatus adapted for only a DVD-ROM can be very inexpensively provided.

However, a reproduction apparatus adapted for only a DVD-RAM must have the structure of a disc reproduction apparatus 91 shown in FIG. 1.

FIG. 1 uses reproduction functional blocks to show the disc reproduction apparatus 91 and a host computer 92. The host computer 92 is loaded with software as a device driver 96 functioning under an operating system (hereinafter referred to as an "OS") 97 in order to be adapted for the disc reproduction apparatus 91. The device driver 96 includes a file system function 96a for reading and holding file management information from a disc loaded into the disc reproduction apparatus 91, and a driver function 96b which functions to execute the reading of file data requested by the OS 97 from file data managed by the file system function 96a.

The disc reproduction apparatus 91 includes a driving unit 93 (for enabling the actual reproduction of data from the disc) composed of, e.g., an optical head, a servo mechanism and a decoding circuit, and a controller 94 for causing the disc driving unit 93 to execute a necessary reproducing operation based on a request from the host computer 92.

The disc reproduction apparatus 91 and the host computer 92 are connected to each other by a small computer system interface (SCSI) or AT attachment packet interface (ATAPI) communication.

According to the above-described reproduction system including the host computer 92 and the disc reproduction apparatus 91, when a read request to a certain data file is generated from the OS 97, the disc driver 96 transmits to the disc reproduction apparatus 91 a read command and positional information for executing a reading operation. The positional information consists of, for example, the start address of a range to be read and a data file length (data length). The start address to be transmitted is a logical address based on the data file management of the disc by the host computer 92.

The controller 94 of the disc reproduction apparatus 91 receives the read command, the address and the data length (as the positional information) transmitted from the host computer 92, and causes the disc driving unit 93 to execute a reading operation in accordance with the transmitted command and information. In the disc driving unit 93, an actual access operation is performed based on a physical address. Accordingly, the transmitted logical-address and data-length information needs to be transformed to physical-address and length information.

For the DVD-ROM medium, by simply adding an offset value to a logical address, a physical address as the sum can be obtained. For this operation, an offset adding function 94a is provided in the controller 94.

Conversely, for DVD-RAM medium, it is required to respond to the defect management condition. Accordingly, in the controller 94 are provided a defect table function 94b for holding a table created based on defect management information read from the disc and replacement information included therein, namely, a defect table created to facilitate address transformation in accordance with replacement information, and an address transformation function 94c for performing address transformation in accordance with the created defect table.

By providing these functions 94a and 94b, address transformation can be performed, if necessary, based on the replacement information in accordance with a defect such as a scratch, and a physical address where data included in the data file to be read is actually recorded and the data length can be generated. The controller 94 commands the disc driving unit 93 to perform a reproducing operation at the location represented by the physical address and the data length.

This executes the reproduction of the data file requested by the disc driving unit 93, and the reproduced data file is transmitted to the host computer 92.

As described above, the reproduction apparatus adapted for the DVD-RAM must have the defect table function 94b and the address transformation function 94c for executing defect management. In order for that the reproduction apparatus adapted for the DVD-RAM to hold defect management information, if the maximum number of defects is d and address data is a (e.g., approximately 7 to 8) bytes in length, a storage region having d×a bytes is necessary. If the maximum number of defects=2000, a storage region having 14 to 16 kilobytes is necessary.

The reproduction apparatus adapted for only the DVD-ROM in which such a storage region is unnecessary needs a storage capacity of several kilobytes, and for which the built-in RAM of the CPU of the controller 94 is normally used. However, in order for the reproduction apparatus adapted for only the DVD-ROM to may be adapted for the DVD-RAM, additional storage of 14 to 16 kilobytes is necessary.

In addition, using the stored defect management information to create the defect table and using the defect table to perform actual address transformation requires firmware having a relatively large size. In general, the size of the firmware is several kilobytes.

Additionally providing the storage capacity and the firmware disadvantageously brings about an increase in disc reproduction apparatus size and cost.

SUMMARY OF THE INVENTION

Accordingly, it is an object of the present invention to provide a reproduction system and method for realizing a reproduction apparatus adapted for not only a DVD-ROM but also a DVD-RAM, without increasing the size and cost of the reproduction apparatus.

To this end, according to an aspect of the present invention, the foregoing object has been achieved through provision of a reproduction system including a host apparatus and a reproduction apparatus for executing a reproduction operation with respect to a predetermined recording medium, both connected so as to mutually communicate, in which the reproduction apparatus includes: reproduction means for reading data from the predetermined recording medium; and reproduction control means for causing the reproduction means to read defect management information recorded in the recording medium in accordance with a command from the host apparatus before transmitting the reproduced defect management information to the host apparatus, and causing the reproduction means to execute a reproduction operation in accordance with both a read request and reading-position information from the host apparatus before transmitting the reproduced data to the host apparatus, and the host apparatus includes: defect management means for holding the defect management information supplied from the reproduction apparatus; and reproduction request means for commanding the reproduction apparatus to read the defect management information on the predetermined recording medium loaded into the reproduction apparatus, and transforming generated logical reading-position information to reading-position information adapted for the condition of the defect management of the predetermined recording medium by referring to the defect management information held in the defect management means before transmitting the transformed reading-position information together with a read request when the host apparatus causes the reproduction apparatus to execute the reading of data.

Preferably, the reproduction control means determines whether or not defect management information is recorded on the predetermined recording medium, and when determining that the defect management information is recorded, the reproduction control means transmits the defect management information to the host apparatus in accordance with a request from the reproduction request means.

The reproduction control means may determine whether the type of the predetermined recording medium is either rewritable or used for only reproduction, and when determining that the type of the predetermined recording medium is rewritable, the reproduction control means may transmit the defect management information to the host apparatus in accordance with a command from the reproduction request means.

According to another aspect of the present invention, the foregoing object has been achieved through provision of a reproduction apparatus capable of executing a reproduction operation with respect to a predetermined recording medium, the reproduction apparatus connected to a host apparatus so as to mutually communicate, in which the reproduction apparatus includes: reproduction means for performing the operation of reading data from the predetermined recording medium; and reproduction control means for causing the reproduction means to execute the reading of defect management information on the predetermined recording medium in accordance with a command from the host apparatus before transmitting the reproduced defect management information to the host apparatus, and causing the reproduction means to execute a reproduction operation in accordance with a read request and reading-position information from the host apparatus before transmitting the reproduced data to the host apparatus.

Preferably, the reproduction control means determines whether or not defect management information is recorded on the predetermined recording medium, and when determining that the defect management information is recorded, the reproduction control means transmits the defect management information to the host apparatus in accordance with a request from the reproduction control means.

The reproduction control means may determine whether the type of the predetermined recording medium is either rewritable or used for only reproduction, and when determining that the type of the predetermined recording medium is rewritable, the reproduction control means may transmit the defect management information to the host apparatus in accordance with a command from the reproduction control means.

According to a further aspect of the present invention, the foregoing object has been achieved through provision of a reproduction method employed in a reproduction system including a host apparatus and a reproduction apparatus both connected so as to mutually communicate for executing a data reproduction operation with respect to a predetermined recording medium, both connected so as to mutually communicate, in which the reproduction method includes the steps of: transmitting of read defect management information in the predetermined recording medium loaded into the reproduction apparatus to the host apparatus; transforming generated logical reading-position information as a position to be read to reading-position information adapted for the condition of the defect management of the predetermined recording medium, based on the defect management information supplied to the host apparatus; and requesting the reproduction apparatus to reproduce data from the predetermined recording medium loaded into the reproduction apparatus.

Preferably, the reproduction method has means for holding the reading-position information obtained by transforming the generated logical reading-position information as a position to be read in accordance with the condition of the defect management of the predetermined recording medium before the step of requesting the reproduction apparatus to reproduce data is performed.

As described above, according to the present invention, defect management information is read from a recording medium so that the defect management of the recording medium can be performed by a host apparatus, and the host apparatus is provided with a necessary address transformation function. When a data reproduction request is generated from the host apparatus to a reproduction apparatus, the host apparatus transmits to the reproduction apparatus, physically-reading-position information obtained after performing address transformation in accordance with the condition of defect management.

Accordingly, firmware for defect management having a relatively large size does not need to be loaded into the reproduction apparatus, which provides a reproduction apparatus adapted also for a RAM recording medium by using a circuit size and a cost identical to those of a reproduction apparatus adapted only for a ROM recording medium.

BRIEF DESCRIPTION OF THE DRAWINGS

FIGS. 4A-1, 4A-2, 4B-1, and 4B-2 are charts illustrating a disc-defect management method.

DESCRIPTION OF THE PREFERRED EMBODIMENT

A disc reproduction system for a DVD-ROM and a DVD-RAM, according to an embodiment of the present invention, will be described in the following order of:
(1) Defect Management Method;
(2) Hardware Structure of Reproduction System;
(3) Functional Blocks of Reproduction System;
(4) Initial Operation; and
(5) Reproduction Operation.

(1) Defect Management Method

An example of a defect management method (shown in FIGS. 2, 3 and 4) proposed for a DVD-RAM will be described below.

Figure 1:
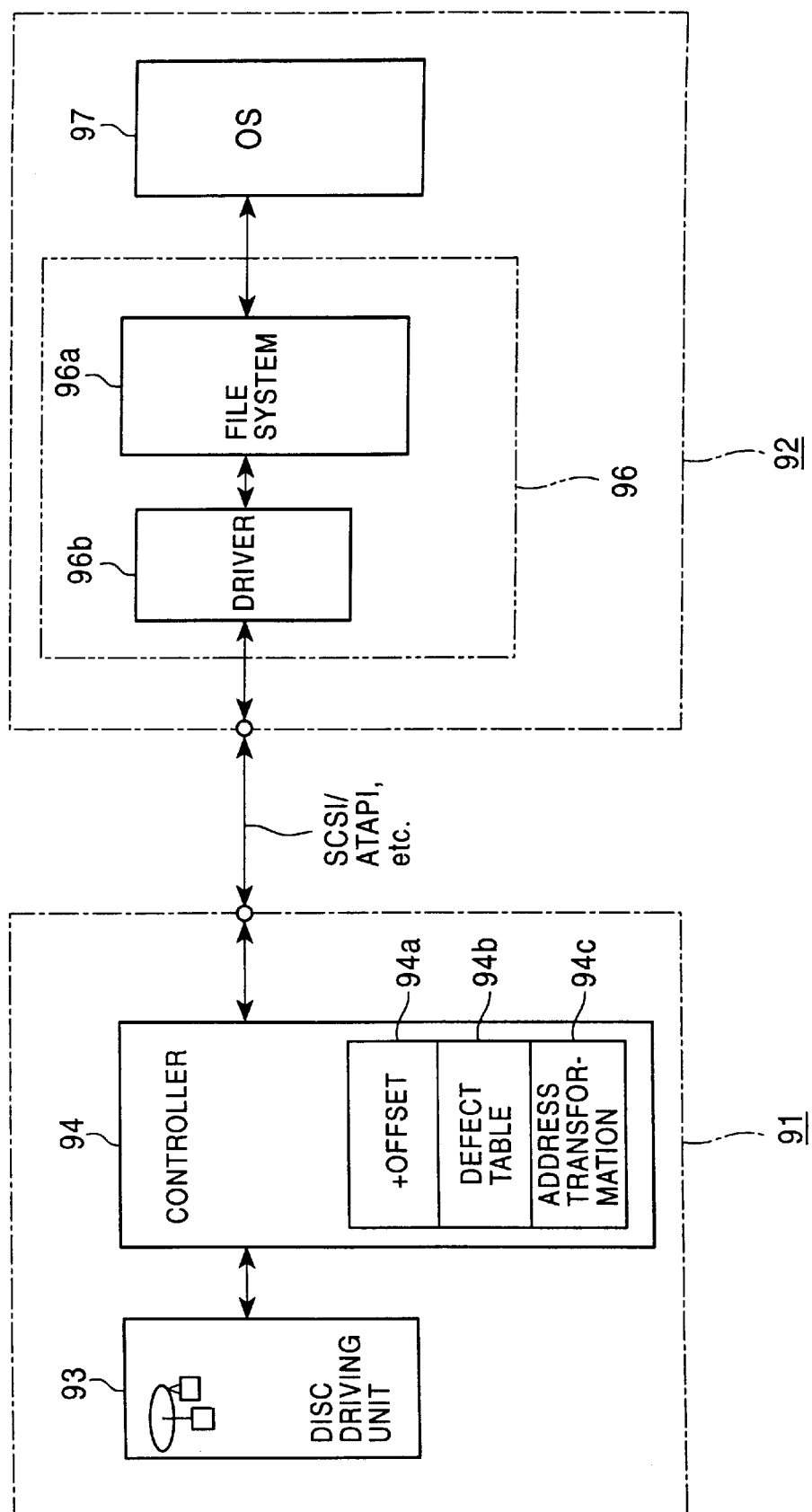
FIG. 1 is a block diagram showing a conventional reproduction system.
Figure 2:
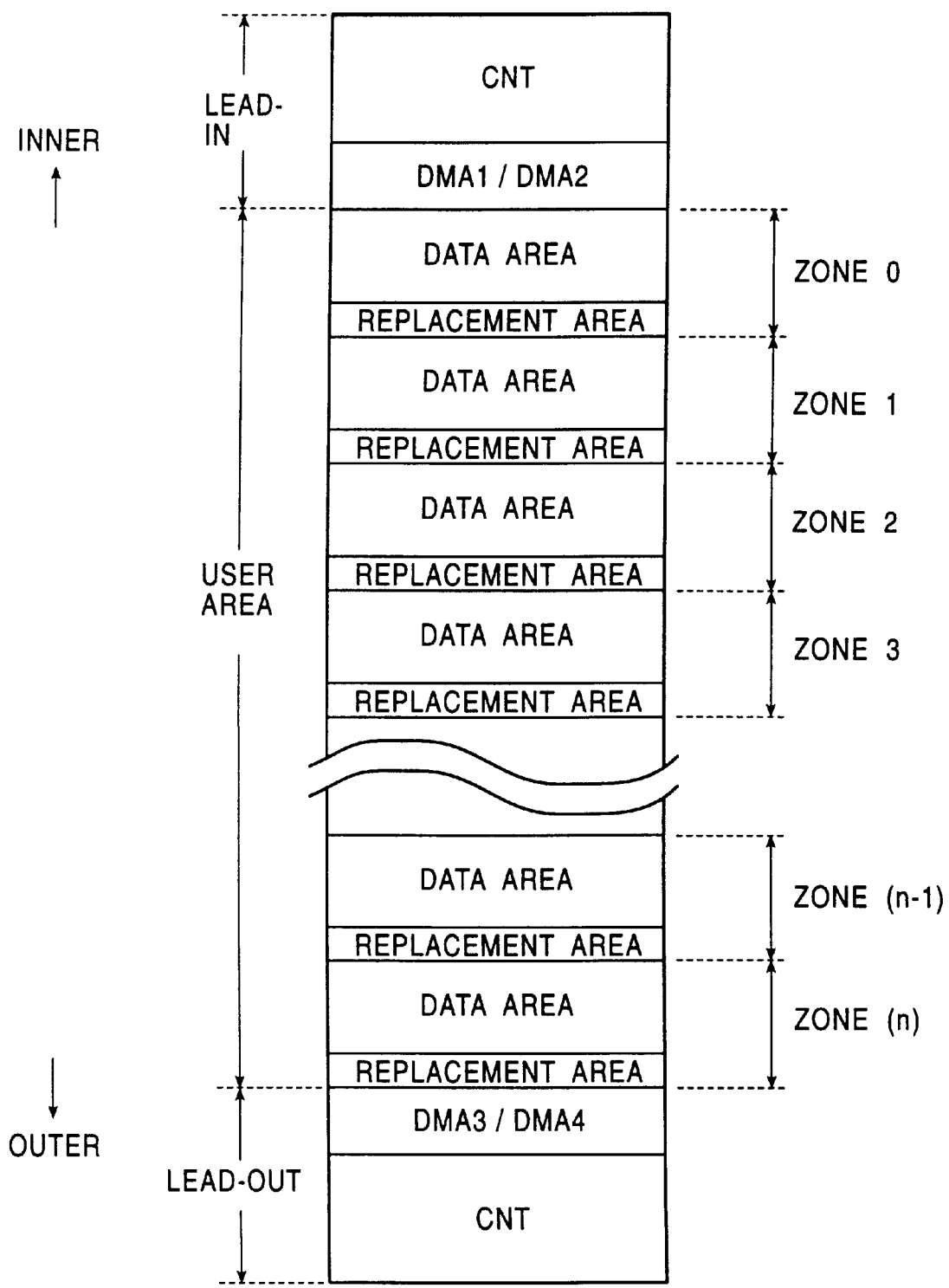
FIG. 2 is a chart showing the structure of a disc.

FIG. 2 shows the schematic, radial area structure of a DVD-RAM.

The innermost portion of the DVD-RAM is used as a leading region, and the outermost portion is used as a lead-out region. The sections between the lead-in region and the lead-out region are used as a user area. The user area is a region in which a data file is actually recorded or reproduced.

In the innermost lead-in region are formed a control area CNT in which various types of disc management information are recorded, and defect management areas DMA1 and DMA2.

Also, in the outermost lead-out region are formed defect management areas DMA3 and DMA4, and a control area CNT in which various types of disc management information are recorded.

The defect management areas DMA1 to DMA4 are basically used to manage the addresses of defect sections and the addresses of replacement sectors formed if necessary when the defective sections are found in the user area.

In order to enhance the security of management, identical contents are recorded in the four defect management areas DMA1 to DMA4.

The user area in which the data file is actually recorded or reproduced is radially separated by a zone techniques into a plurality of regions, namely, n zones: zone zero 0 to zone (n) as shown in FIG. 2.

Each zone is provided with a data area and a replacement area corresponding thereto. Accordingly, when the user area is separated into n zones, n data areas and n replacement areas are formed. When the data area includes a defective portion not used for recording or reproduction due to a scratch, the replacement area provides a portion in the place of the defective portion.

Addresses representing positions on the disc include two types: physical addresses (or physical block addresses (PBAs)) and logical addresses (or logical block addresses (LBAs)). The physical addresses are formed by sequentially numbering the blocks between the start of the lead-in region and the end of the lead-out region. The physical addresses are so-called "absolute addresses" of the disc. One block is, for example, a 32-kilobyte (16-sector) data unit, which forms one ECC unit. The inner to outer tracks of the disc are composed of the sequential blocks.

The logical addresses are provided to the user area used as an access range in ordinary recording or reproduction. The start block in the user area corresponds to logical address zero. In other words, by adding to one logical address the address of the lead-in region as an offset, a physical address as the sum can be obtained.

In the DVD disc, the start address of the user area is set at, e.g., physical address 30000h. Accordingly, physical address PBA "30000h"=logical address LBA "0h".

The logical addresses are not always provided to physically fixed positions on the disc, but are basically provided to record data files. Therefore, if a physically recording position is shifted behind by one block due to defect management, or the block of a certain replacement area is used, such a change is not reflected by the logical address itself.

Figures 3A, 3B, 3C:
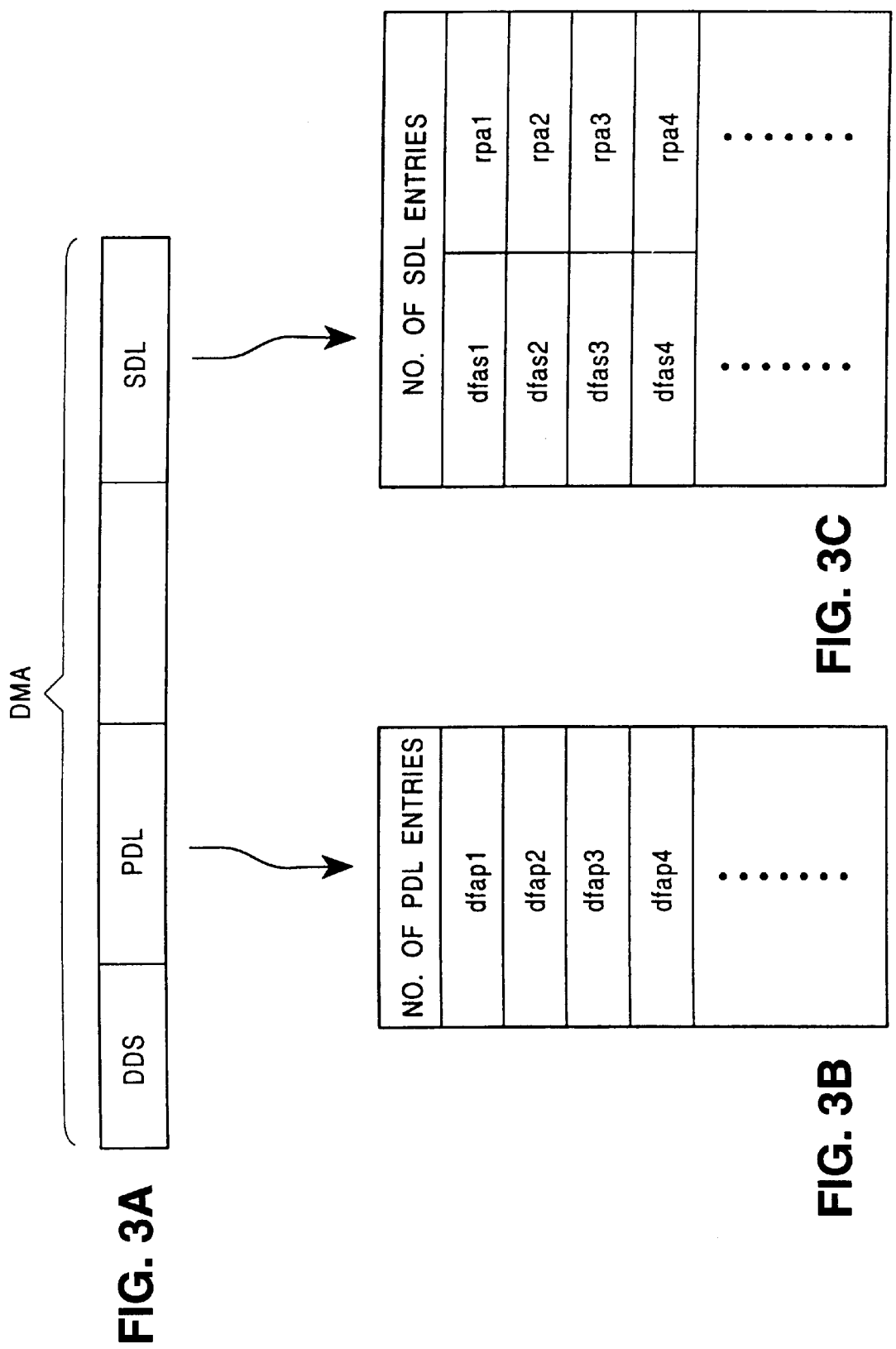
FIGS. 3A–3C are charts showing the structure of a disc management area.

In each defect management area DMA1, DMA2, DMA3 or DMA4 formed for defect management, there are formed as defect management information a disc definition structure (DDS), a primary defect list PDL and a secondary defect list SDL as shown in FIG. 3(a). The DDS is used to manage a position at which information for defect management is recorded. In the DDS are recorded the addresses of the PDL, the SDL, a replacement area, and so forth. Accordingly, when reproduction from the disc is performed, initially reading the DDS enables access to real information for defect management.

As shown in FIG. 3(b), in the PDL are recorded defect addresses dfaP1, dfaP2, dfaP3, etc. obtained when defective blocks are found, and in its start is recorded as an PDL entry number the number of blocks found as the defect addresses.

A defect management form by the PDL is a so-called "slipping" form, which is generated, for example, when the disc is formatted.

For defect management, intially, the total recording surface of the disc is checked for a defective block when the disc is produced or formatted.

If defective blocks are found in this check, their addresses are sequentially recorded as the defect addresses dfap1, dfaP2, dfaP3, etc. in the PDL.

In this case, a replacement block for each defective block found is the block next to the found defective block. In other words, blocks used for recording are shifted in accordance with defective blocks, and this is called "a slipping process".

In FIG. 4A, the slipping process is schematically shown.

One division shown in FIG. 4A indicates one block, and the total of divisions indicates the sections between "Bn−3" and "Bn+5" (certain sections in the user area) as physical addresses (PBAs). If the block at physical address Bn is defective, the value of physical address Bn is recorded as defect address dfap(x) in the PDL.

In this case, the slipping process is performed when the block at the next physical address Bn+1 is used in place of the block at physical address Bn. Accordingly, the blocks are used with one block shifted, as indicated by addresses in parentheses below the second row shown in FIG. 4A. (However, the physical addresses are not actually changed as a matter of course).

In the PDL, as defect management information for the slipping process, a replacement block for a defective block is the block next to the defective block, which thus eliminates the need for managing the address of a block in place of the defective block. Therefore, in the PDL are consumed only several bytes (7 to 8 bytes) for the address of each defect address. The number of defective blocks found in defect checking is recorded as the PDL entry number.

The SDL is used to manage defective sectors found in the user operating condition.

In the SDL are recorded defect addresses dfas1, dfaS2, dfaS3, etc. obtained when defective blocks are found, and addresses rpa1, rpa2, rpa3, etc. as replacement blocks corresponding to the defective blocks. In addition, in the start of the SDL is recorded as an SDL entry number the number of found, recorded defective blocks.

A defect management form by the SDL is a so-called "linear replacement" in which, list contents are updated whenever a defective block is found in the user operating condition.

In other words, a block in a replacement area is assigned as the replacement block for the defective block found in the user operating condition. Accordingly, as described above, 14 to 16 bytes composed of several bytes (7 to 8 bytes) as defect address dfa(x) and several byte (7 to 8 bytes) as replacement address rpa(x) in the SDL data are used per defective block found.

In FIG. 4B, a schematic chart of the linear replacement process is shown.

Also, in FIG. 4B are shown as physical addresses (PBAs) the sections between "Bn−3" and "Bn+5" (certain sections in the user area), and it is assumed that the block at physical address Bn is newly found as a defective block. Therefore, a block to substitute for the block at physical address Bn is provided in the form of a certain block (address Bm+2) in the replacement area. The address Bn of the defective block as defect address dfa(x) and the address Bm+2 of the provided replacement block as replacement address rpa(x) are recorded in the SDL.

In this case, thereafter, a linear replacement process is performed in which the block at physical address Bm+2 is used in place of the block at physical address Bn.

Defect conditions are managed in the defect management areas DMAs as described above. Thus, a recording or reproduction system can perform a recording or reproduction operation in accordance with the defect management for the disc by reading the DMA information from the disc D.

(2) Hardware Structure of Reproduction System

Figure 5:
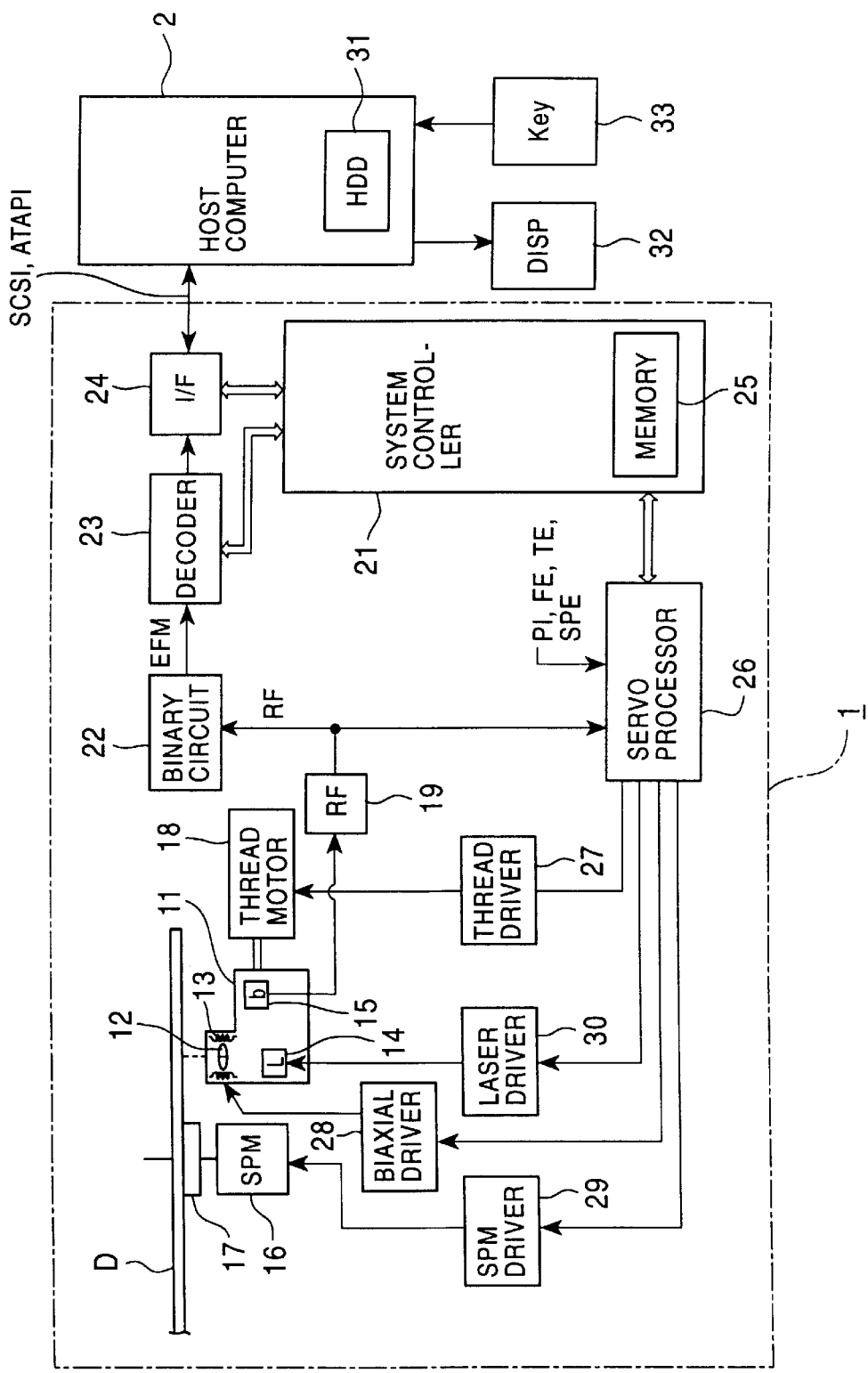
FIG. 5 is a block diagram showing the hardware structure of a reproduction system according to an embodiment of the present invention.

FIG. 5 shows a hardware block diagram of a reproduction system according to the present invention.

This reproduction system is formed by connecting a disc reproduction apparatus 1 and a host computer 2 via a SCSI or ATAPI so that they can communicate with each other.

The host computer 2 includes, for example, a hard disc drive 31 as an internal storage medium, in which application software or the like is installed. In addition, the reproduction system is provided with a keyboard 33 as an input device to the host computer 2, and a display unit 32 as a display output device.

A DVD-RAM or DVD-ROM as a disc D is loaded into the disc reproduction apparatus 1.

The disc D is mounted on a turntable 17, and is rotated at a constant linear velocity by a spindle motor 16 in the reproduction mode.

Data recorded in the form of embossed pits or phase-change pits on the disc D is read by using a pick-up 11.

The pick-up 11 is provided with an optical system most suitable for the DVD. For example, a laser diode 14 as a laser beam source outputs a laser beam having a central wavelength of 650 or 635 nm. An objective lens 12 has NA=0.6. The objective lens 12 is held by a biaxial mechanism 13 so as to move in the tracking direction and the focusing direction.

Data reading is performed by using the pick-up 11 with respect to the disc D. In the pick-up 11, a detector 15 detects reflected-light information from the disc D, and converts it to electric signals in accordance with the quantity of the received light before outputting the electric signals to an RF amplifier 19.

The RF amplifier 19 includes a current-voltage converting circuit, an amplifying circuit, a matrix operation circuit, and so forth, and generates necessary signals, based on the signals from the detector 15. For example, the RF amplifier 19 generates an RF signal as reproduced data, a focusing error signal FE for servo control, a tracking error signal TE, a pull-in signal PI as a so-called "sum signal", and so forth.

The various signals generated by the RF amplifier 19 are supplied to a binary circuit 22 and a servo processor 26. In other words, the reproduced RF signal from the RF amplifier 19 is supplied to the binary circuit 22, and the focusing error signal FE, the tracking error signal TE and the pull-in signal PI are supplied to the servo processor 26.

The reproduced RF signal obtained by the RF amplifier 19 is converted by the binary circuit 22 to binary values, whereby it is converted to an eight-to-fourteen-modulation (EFM) plus signal (eight-to-sixteen modulation signal). The EFM plus signal is supplied to a decoder 23. The decoder 23 reproduces information read from the disc D by performing EFM plus demodulation, cross-interleaved Reed-Solomon-code (CIRC) decoding, and by also performing CD-ROM decoding, moving-picture-experts- group (MPEG) decoding if necessary.

The data decoded is transmitted to the host computer 2 via an interface unit 24.

The servo processor 26 generates various types of servo-driving signals such as focusing, tracking and thread, spindle signals in order to execute servo operations by using the focusing error signal FE and the tracking error signal TE from the RF amplifier 19 and a spindle error signal SPE from the decoder 23 or a system controller 21.

In other words, the servo processor 26 generates the focusing driving signal and the tracking driving signal in accordance with the focusing error signal FE and the tracking error signal TE, and supplies the generated signals to a biaxial driver 28. The biaxial driver 28 drives the biaxial mechanism 13 by supplying currents based on the focusing error signal FE and the tracking error signal TE, to the focusing coil and the tracking coil of the biaxial mechanism 13. This forms a tracking servo loop and a focusing servo loop by the pick-up 11, the RF amplifier 19, the servo processor 26 and the biaxial driver 28.

The servo processor 26 also supplies a spindle motor driver 29 with the spindle-driving signal generated in accordance with the spindle error signal SPE. The spindle motor driver 29 causes the spindle motor 16 to rotate at a constant linear velocity by applying, for example, a three-phase driving signal to the spindle motor 16 in accordance with the spindle-driving signal. The servo processor 26 generates the spindle driving signal in accordance with a spindle accelerating/braking control signal, and causes the spindle motor driver 29 to operate or stop the spindle motor 16.

The servo processor 26 generates a thread driving signal, based on, for example, a thread error signal obtained from a low range component of the tracking error signal TE, and access executing control from the system controller 21, and supplies the generated signal to a thread driver 27. The thread driver 27 drives a thread mechanism 18 in accordance with the thread-driving signal. The thread mechanism 18 moves the whole of the pick-up 11 in the disc radial direction. The thread driver 27 drives the thread motor 18 in accordance with the thread driving signal, whereby the proper sliding movement of the pick-up 11 is performed.

The laser diode 14 of the pick-up 11 is activated by the laser driver 30 to emit a laser beam.

The servo processor 26 generates a laser driving signal so as to execute laser emission by the pick-up 11 in the reproduction mode, based on an instruction from the system controller 21, and supplies the generated signal to the laser driver 30. The laser driver 30 causes the laser diode to emit a laser beam in accordance with the laser-driving signal.

The above-described, servo and decoding operations are controlled by the system controller 21 including a microcomputer.

Operations such as reproduction starting, terminating, track accessing, rapid reproduction, and rapid backward reproduction are realized such that the system controller 21 controls the movement of the servo processor 26 or the pick-up 1.

A memory 25 is a CPU built-in memory in the system controller 21 as a microprocessor, and is used as storage for various operation data necessary for control movement, or a work region.

Control of reproduction from the disc D by the system controller 21 is executed in accordance with a reproduction request and a reproduction position designation from the host computer 2.

In other words, the host computer 2 transmits, together with a command as the reproduction request, an address (in this case a physical address adapted for defect management as described below) as reproduction position information and a data length. In accordance therewith, the system controller 21 controls the servo processor 26 to execute the rotation of the spindle motor 16 and access by the pick-up 11 to the disc D, so that the requested data file is read. Subsequently, consecutive control of reproducing operation is completed by transmitting the data file, read by the pick-up 11 and decoded by the decoder 23, from the interface unit 24 to the host computer 2.

(3) Functional Blocks of Reproduction System

Figure 6:
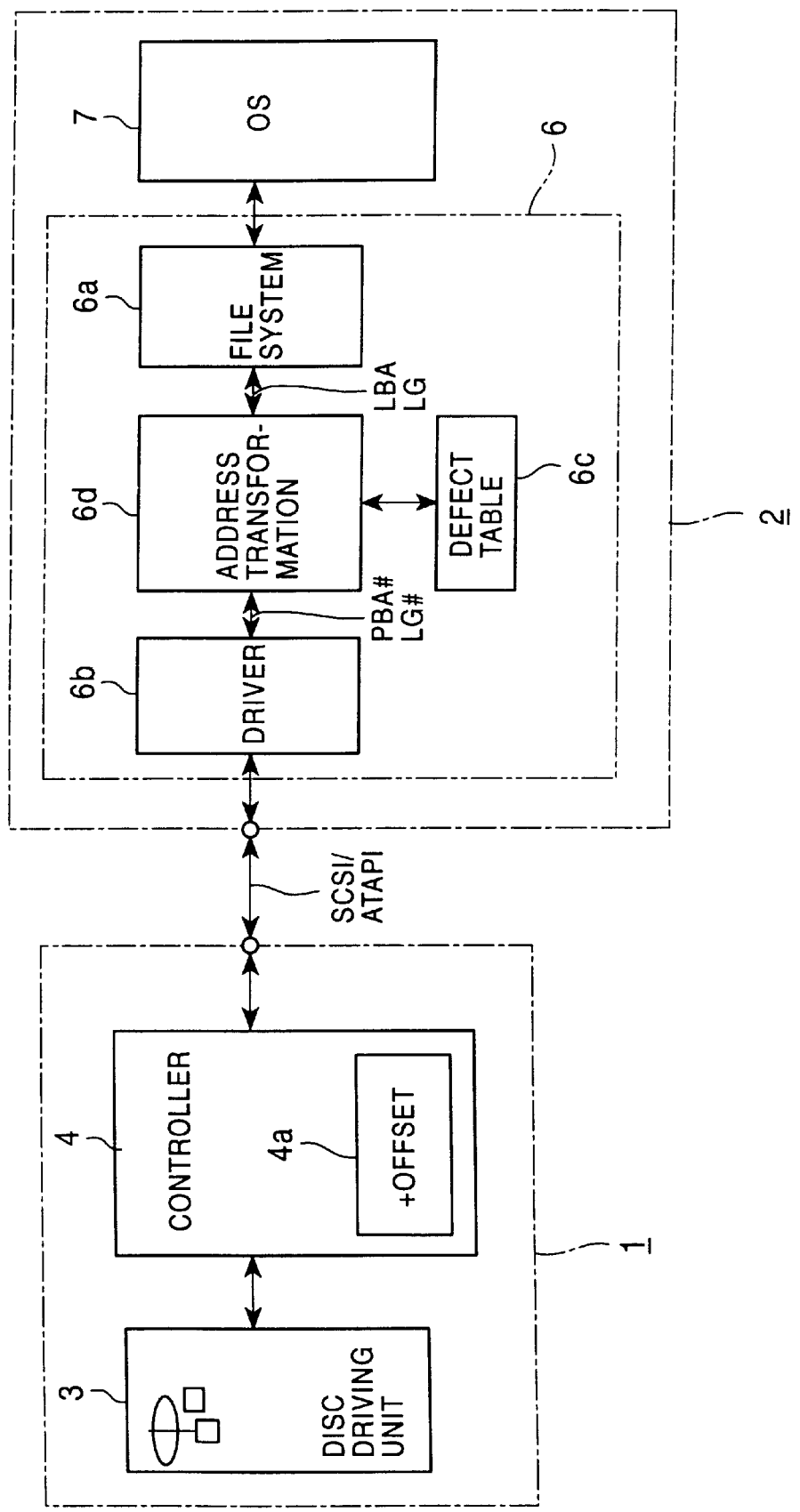
FIG. 6 is a block diagram showing a reproduction system according to an embodiment of the present invention.

FIG. 6 shows a reproducing operation by the reproduction system described with reference to FIG. 5, in the form of a functional block diagram.

The host computer 2 has a software as a device driver 6 functioning under an operating system (OS) 7 so as to be adapted for the disc reproduction apparatus 1. The disc driver 6 has a file system function 6a for holding read file management information from the disc D loaded into the disc reproduction apparatus 1, and a driver function 6b for executing the reading of the file data requested by the OS 7 from the file data managed by the file system function 6a.

In this embodiment, the device driver 6 has a defect table function 6c for holding defect management information read from the disc D and holding a table created based on replacement information in the defect management information, namely, a defect table for holding a defect table produced to facilitate address conversion in accordance with replacement information. The device driver 6 also has an address transformation function 6d for using the defect table to perform address conversion in accordance with the replacement information.

The disc reproduction apparatus 1 includes a disc driving unit 3 composed of, for example, an optical head, a servo mechanism, a decoding circuit, etc., which enables the actual reproducing of data from the disc D. The disc driving unit 3 corresponds to the components excluding the system controller 21 and the interface unit 24 in the disc reproduction apparatus 1 shown in FIG. 5. The disc driving unit 3 is provided with a controller 4, which corresponds to the system controller 25 and the interface unit 24 shown in FIG. 5.

When a reading request to a certain data file is generated from the OS 7 in the reproduction system composed of the host computer 2 and the disc reproduction apparatus 1, the disc driver 6 transmits to the disc reproduction apparatus 1 a read command (reading request) and positional information on a location in which reading is executed.

In this embodiment, the positional information consists of the start address of a range in which reading is executed, and a data file length (data length). The start address to be transmitted is one or a plurality of physical addresses PBA# and a data length LG# obtained by transforming a logical address LBA and a data length LG based on data file management for the disc D by the host computer 2.

The controller 4 of the disc reproduction apparatus 1 receives the read command from the host computer 2 and the address and data length as reading-position information, whereby causing the disc driving unit 3 to execute reading in accordance with the received reading-position information. However, the controller 4 treats the received address as a logical address, similar to its conventional response to a DVD-ROM. In other words, regardless of whether or not the loaded disc is a DVD-RAM, the controller 4 treats the transmitted information composed of physical addresses PBA# and data length LG# as a logical address and a data length, and accordingly, obtains a physical address where actual reading from the disc D is executed by using an offset adding function 4a to add an offset to the logical address.

Data reproduction control is executed based on the obtained physical address and data length LG#.

In other words, according to this embodiment, address transformation based on the defect management condition, necessary for a DVD-RAM medium, is executed in the device driver 6 of the host computer 2. A reproduction instruction to the disc reproduction apparatus 1 is sent, with address transformation suitable for defect management performed.

Accordingly, the disc reproduction apparatus 1 only needs to simply execute the adding of an offset to the address transmitted with the reading request, regardless of whether or not the disc D is a DVD-ROM medium or DVD-RAM medium.

The present invention will be continuously described with this embodiment as in the case where the disc reproduction apparatus 1 executes offset addition as described above. However, the reproduction system may have a structure in which the controller 4 of the disc reproduction apparatus 1 uses a supplied address as an actual reading address to execute access for reproduction.

(4) Initial Operation

Figure 7:
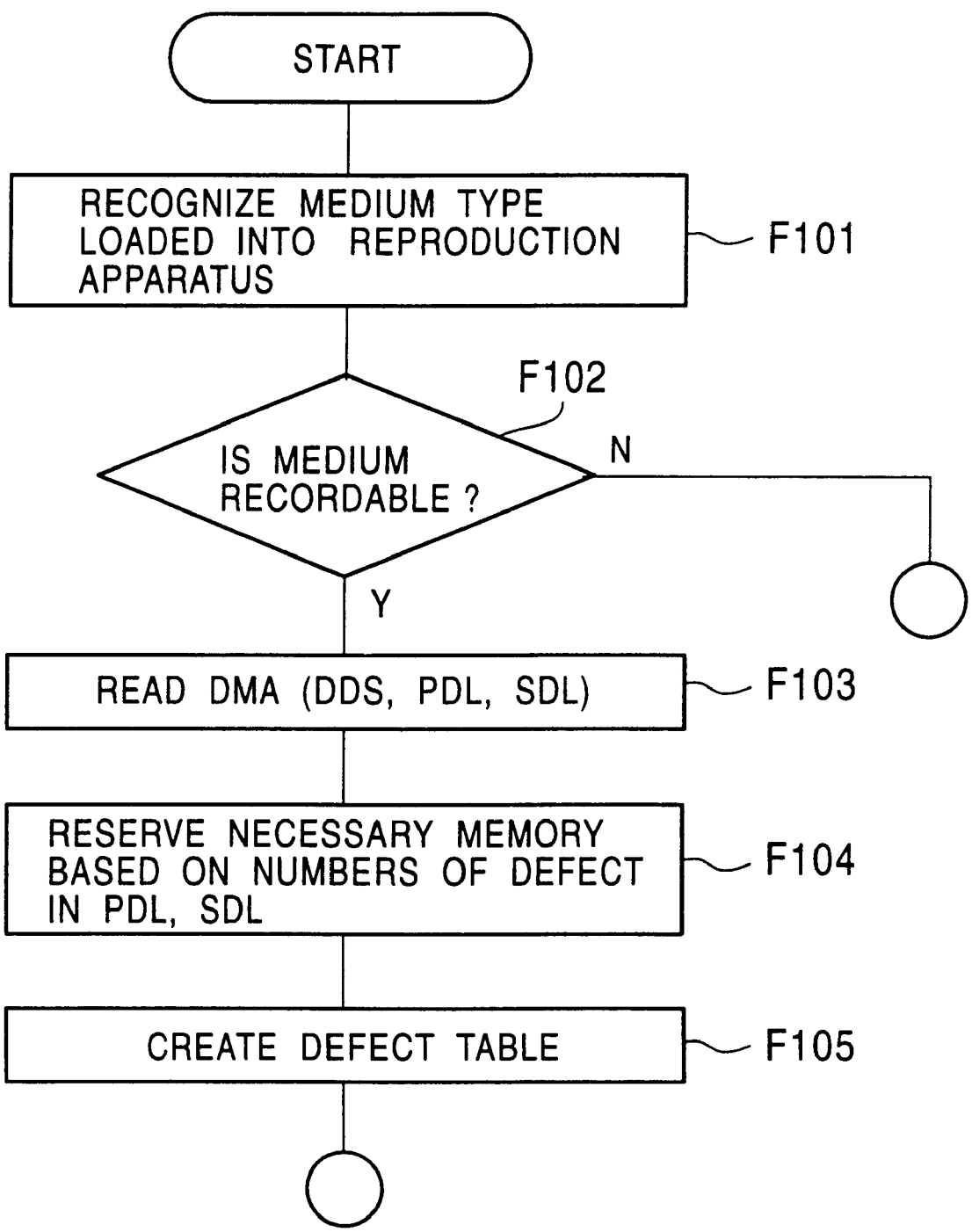
FIG. 7 is a flowchart showing an initial process performed by a reproduction system according to an embodiment of the present invention.

An initial operation for reproduction, of the reproduction system, will be described as a specific example with reference to a flowchart shown in FIG. 7.

This initial operation is a process of the host computer 2, which is executed when the disc D is loaded into the disc reproduction apparatus 1, or when the host computer 2 is activated with the disc D being loaded into the disc reproduction apparatus 1.

In step F101, the host computer 2 initially recognizes the type of the disc D loaded into the disc reproduction apparatus 1, in other words, whether the type is either a DVD-ROM or DVD-RAM. In the case of SCSI or ATAPI connection as described in this embodiment, the host computer 2 can determine the type of the disc D, based on medium type information as a parameter of a mode sense command.

When the disc D is a DVD-ROM, no particular initial process is necessary, which ends the initial process at step F102.

When the disc D is a DVD-RAM, the host computer 2 proceeds from step F102 to F103 in order to execute defect management-related steps included in the initial process.

In step F103, the host computer 2 uses a particular command to direct the disc reproduction apparatus 1 to read defect management areas DMAs on the disc D. Specifically, the host computer 2 directs the disc reproduction apparatus 1 to reproduce the defect management information as the disc definition structure DDS, the primary defect list PDL and the secondary defect list SDL, and causes the disc reproduction apparatus 1 to transmit the reproduced defect management information to the host computer 2. The host computer 2 inputs the transmitted defect management information in a memory region to be used by the device driver 6.

The normal access range on the disc D is within the user area, while the defect management areas (DMAs) are outside the user area.

Accordingly, in order for the host computer 2 to read information in one defect management area DMA on the DVD-RAM as the disc D, the range of the logical address LBA in connection with a reading request needs to be extended by the size of the defect management areas before and behind the user area. According to a proposed DVD-RAM standard, the range of the logical address LBA is extended before and after the user area by 60h.

After the defect management information is read from the disc D, in step F104 a necessary memory region is reserved based on the numbers of defects recorded in the primary defect list PDL and the secondary defect list SDL. In step F105, a defect table for transforming the logical address LBA to the physical address PBA# is created based on the primary defect list PDL and the secondary defect list SDL.

The physical address PBA# is an address corresponding to a physical replacement position in accordance with the condition of defect management, and is an address to which an offset has not been added for logical address-to-physical address transformation.

That is, the disc reproduction apparatus 1 adds the offset to the physical address PBA#, whereby an actual physical reading position can be represented by the sum.

As described above, in step F105, a defect table with offset addition performed can be created. In this case, the disc reproduction apparatus 1 simply needs to execute address control similar to that performed when the DVD-ROM is loaded.

When the defect table is created and the defect table function 6c of the device driver 6 is activated, the initial process ends. Thereafter, when a reproduction operation with respect to the disc D as the DVD-RAM is requested, the address transformation function 6d uses the defect table function 6c to perform address transformation, and the driver function 6b uses the transformed address PBA# and data length LG# to send a reading request with respect to the disc reproduction apparatus 1.

(5) Reproduction Operation

Figure 8:
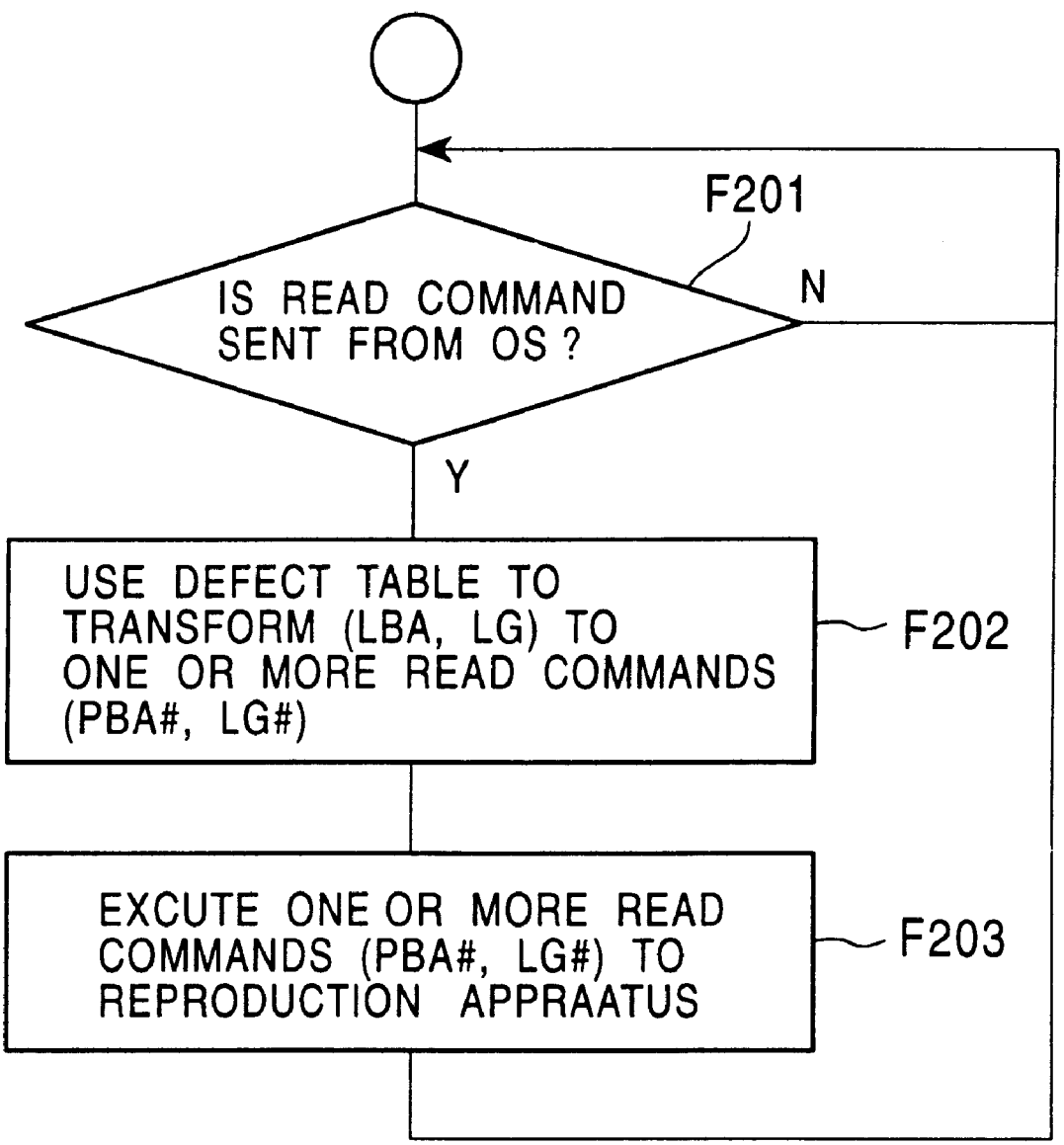
FIG. 8 is a flowchart showing a reproduction process performed by a reproduction system according to an embodiment of the present invention.

A process for the case where a reading request is generated from the OS 7 after the initial process ends is shown in FIG. 8.

When a request for reading a necessary data file is generated from the OS 7, the process proceeds from step F201 to step F202. At this time, file management by the file system function 6a generates the logical address LBA and data length LG of the necessary data file.

Here, the address transformation function 6d uses the defect table function 6c to transform the logical address LBA and data length LG to one or a plurality of positional information pieces, namely, physical address PBA# and data length LG#.

Concerning the above-described address transformation process, different types of necessary processes are executed in accordance with the following three cases the case that the data to be read includes no defective block; the case that the data file to be read includes a defective block recorded in the primary defect list PDL; and the case that the data file to be read includes a defective block recorded in the secondary defect list SDL.

In reality, there may be various cases such as the case that the data file to be read includes a plurality of defective blocks recorded in the primary defect list PDL, the case that the data file to be read includes a plurality of defective blocks recorded in the secondary defect list SDL, and the case that the data file to be read includes both a defective block recorded in the primary defect list PDL and a defective block recorded in the secondary defect list SDL. In accordance with the type of defective block, positional information transformation (address and data-length transformation) as described below is performed.

Initially, when it is determined that the data file sections to be read includes no defective block as a result of referring to the defect management information, actual address and data-length transformation is not performed.

For example, when a reading request in which logical address LBA=16W and data length LG=4 is generated, it is requested that the data files of four blocks having logical addresses: 16W; 16W+1; 16W+2; and 16W+3 be reproduced. However, if it is confirmed based on the defect management information (or defect table) stored in the defect table function 6c that no defective blocks exist in the actual recording areas of the disc D corresponding to the four blocks, the address transformation unit 6a does not need to particularly perform address transformation in accordance with defect condition, and it transfers to the driver function 6b the values in which logical address LBA=16W and data length LG=4 as values in which physical address PBA#=16 and data length LG#=4.

After the above-described processing in step F202 ends, the driver function 6b executes the read command with respect to the disc reproduction apparatus 1 in step F203. In other words, it transmits a read request command and the reading-position information in which address=16W and data length=4.

In response to the read command output from step F203, the disc reproduction apparatus 1 recognizes the transmitted address (physical address PBA#) as an address to which no offset is added, namely, a logical address, and the controller 4 uses the offset adding function 4a to add an offset value to the logical address to form an actual physical address PBA. The controller 4 instructs the disc driving unit 3 to execute a reproducing operation in the sections represented by the data length LG (=LG#) from the physical address PBA, and transmits the reproduced data files to the host computer 2.

In addition, when it is confirmed as a result of referring to the defect management information that data file sections to be read based on a request from the OS 7 include a defective block recorded in the primary defect list PDL, address transformation according to such a case, namely, address transformation according to slipping is performed in step F202.

The address transformation will be described with reference to FIG. 9.

Figure 9:
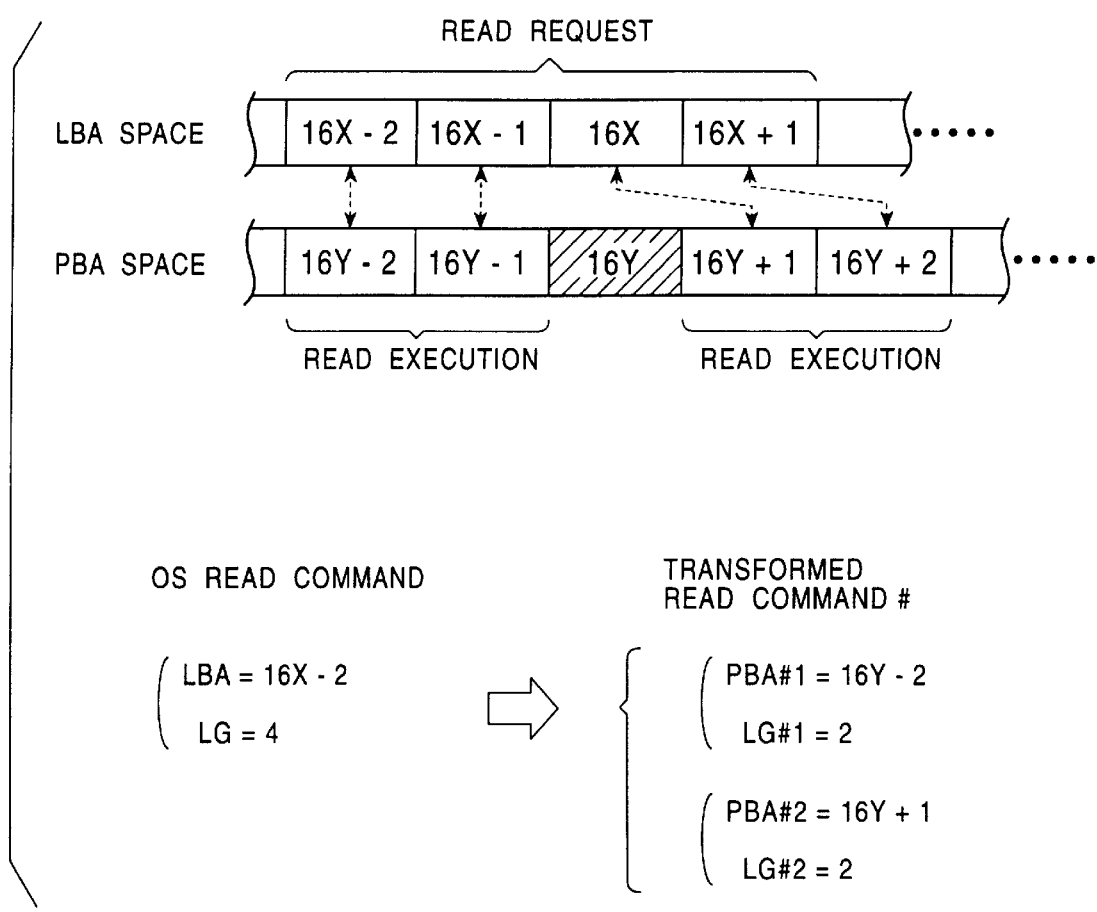
FIG. 9 is a chart illustrating an address transformation process performed by a reproduction system according to an embodiment of the present invention.

For example, when a reading request in which logical address LBA=16X-2 and data length LG=4 is generated, it is requested that the data files of four blocks having addresses: 16X-2; 16X-1; 16X; and 16X+1 be reproduced, as shown as the LBA space in FIG. 9.

However, if the recording block having the physical address corresponding to the block having logical address 16X (corresponding to physical address 16Y in the PBA space) is recorded in the primary defect list PDL, the reading request-related reading position in which logical address LBA=16X-2 and data length=4 means that it is requested that the data files of four blocks: 16Y-2; 16Y-2; 16Y+1; and 16Y+2 be reproduced, as shown in FIG. 9, because defective blocks in which slipping is performed must be recorded in the primary defect list PDL.

In other words, the address transformation unit 6d uses the defect table function 6c to transform the reading position information in which logical address LBA=16X-2 and data length LG=4, to positional information representing physical addresses: 16Y-2, 16Y-1, 16Y+1 and 16Y+2. Specifically, two groups of sections are formed before and after physical address 16Y. Thus, the two groups of sections are transformed into two pieces of positional information: information in which physical address PBA#1=16Y-2 and data length LG#1=2; and information in which physical address PBA#2=16Y+1 and data length LG#2=2, which are transferred to the driver function 6b.

After the above-described address transformation in step F202 ends, the driver function 6b executes the read command to the disc reproduction apparatus 1 in step F203, whereby transmitting a read request command and the following values as reading position information: (address= 16Y-2, data length=2) and (address=16Y+1, data length=2).

In response to the read command executed in step F203, the disc reproduction apparatus 1 recognizes the transmitted address (physical addresses PBA#1 and PBA#2) as addresses to which no offsets are added, namely, logical addresses. The controller 4 uses the offset adding function 4a to add offset values to the logical addresses to form actual physical addresses PBA1 and PBA2. The controller 4 instructs the disc driving unit 3 to execute a series of: a reproduction operation in the two block sections represented by the data length LG (=LG#1=2) from the physical address PBA1; and a reproduction operation in the two block sections represented by the data length LG (=LG#2=2) from physical address PBA2, whereby reproduction is performed and the reproduced data files are transmitted to the host computer 2. This completes the data file reproduction of the sections requested by the OS 7.

Also, when the data file sections to which a read request is generated from the OS 7 includes a defective block recorded in the secondary defect list SDL as a result of referring to the defect management information, address transformation according to such a case is performed in step F202, and in this case, address transformation according to linear replacement is performed.

This address transformation will be described with reference to FIG. 10.

Figure 10:
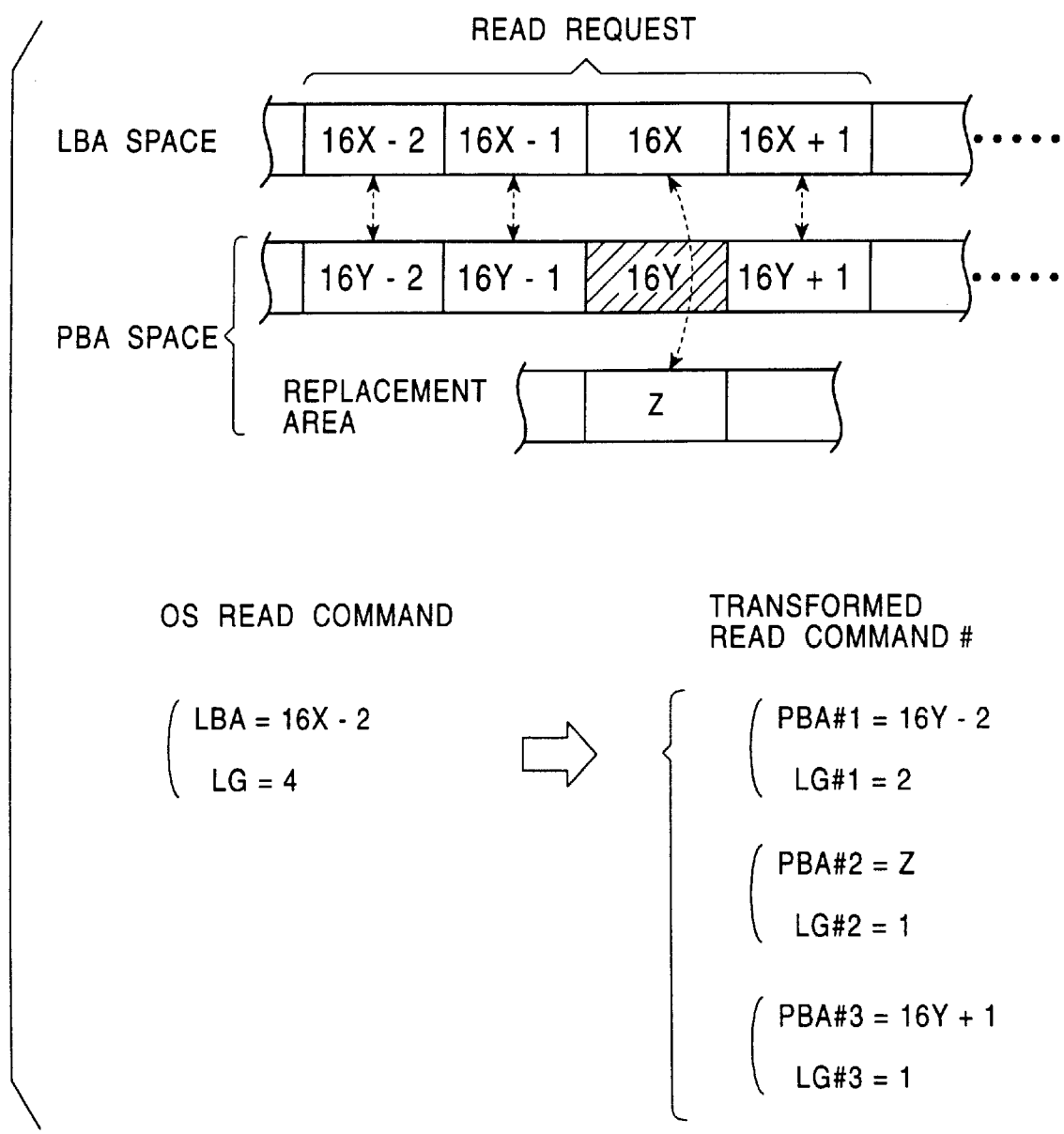
FIG. 10 is a chart illustrating an address transformation process performed by a reproduction system according to an embodiment of the present invention.

For example, when a read request in which logical address LBA=16X-2 and data length LG=4 is generated, it is requested as shown as the LBA space in FIG. 10 that the data files of four blocks having logical addresses: 16X-2; 16X-1; 16X; and 16X+1 be reproduced.

However, if the recording block having the physical address corresponding to logical address 16X (corresponding to physical address 16Y in the PBA space shown in FIG. 10) is recorded in the secondary defect list SDL, the reading position in which logical address LBA= 16X-2 and data length LG=4 in connection with this read request means that it is required as shown in FIG. 10 that the data files of four blocks: data area blocks (addresses 16Y-2 and 16Y1); one replacement area block (physical address Z); and one data area block (address 16Y+1) be reproduced because the addresses of the defective block and the replacement block to be processed by linear replacement are recorded in the secondary defect list SDL.

Accordingly, the address transformation unit 6d uses the defect table function 6c to transform the reading position information in which logical address LBA=16X-2 and data length LG=4 to positional information representing physical addresses: 16Y-2; 16Y-1; Z; and 16Y+1. Specifically, since the portion to be read is separated into three sections, the address transformation unit 6d transforms the reading position information into three pieces of positional information: positional information in which physical address PBA#1=

16Y−2 and data length LG#1=2; positional information in which physical address PBA#2=Z and data length LG#2=1; and positional information in which physical address PBA#3=16Y+1 and data length LG#3=1. The pieces of the transformed information are transferred to the driver function 6b.

After the above-described transformation executed in step F202 ends, the driver function 6b executes the read command to the disc reproduction apparatus 1, whereby transmitting a read request command and the following values as reading position information: (address=16Y−2, data length=2); (address=Z, data length LG=1); and (address=16Y+1, data length LG=1).

In response to the read command executed in step F203, the disc reproduction apparatus 1 recognizes the transmitted addresses: physical addresses PBA#1; PBA#2; and PBA#3 as addresses to which no offsets are added, namely, logical addresses. The controller 4 uses the offset adding function 4a to add offsets to the logical addresses to form actual physical addresses: PBA1; PBA2; and PBA3. The controller 4 instructs the disc driving unit 3 to execute a series of: a reproduction operation in two block sections represented by the data length LG (=LG#1=2) from the physical address PBA1; a reproduction operation in one block section represented by the data length LG (=LG#2=1) from physical address PBA2; and a reproduction operation in one section represented by the data length LG (=LG#3=1), whereby reproduction is performed and the reproduced data files are transmitted to the host computer 2. This completes the data file reproduction of the sections requested by the OS 7.

The foregoing processing allows the disc reproduction apparatus 1 to operate such that, when a read request is generated from the host computer 2, the disc reproduction apparatus 1 simply adds offsets to transmitted addresses and executes reproduction operation in accordance with the sums.

In other words, the disc reproduction apparatus 1 is provided with the function of executing a reproduction operation in defect management areas DMAs in accordance with a particular command from the host computer 2 before transmitting the reproduced data to the host computer 2 in other words, the disc reproduction apparatus 1 is provided with small software for responding to a particular command, whereby the disc reproduction apparatus 1 can handle a DVD-RAM medium in connection with ordinary reproduction by using its almost conventional functions adapted for only a DVD-ROM particularly without being provided with large firmware for defect management.

In addition, the device driver 6 in the host computer 2 executes defect management, the efficiency of which is high because memory regions can be reserved in accordance with the number of defects in the host computer 2. In other words, when the disc reproduction apparatus 1 performs defect management, it needs to be provided with storage capacity for processing the maximum number of defects, which can be managed by the defect management areas DMAs for the DVD-RAM medium, and which is set to be much greater than the number of ordinarily generated defects. However, when the host computer 2 performs defect management, the storage region can be reserved in accordance with the number of defects read from the medium and actually recorded. For example, even if one hundred defective blocks are recorded in the primary defect list PDL and one hundred defective blocks are recorded in the secondary defect list SDL, storage capacity of approximate one kilobyte is sufficient, and no storage space waste is generated in the use of storage in the host computer 2 (that is, the use of storage in the whole system).

The present invention has been described by referring to the foregoing embodiment. However, it need hardly be said that the present invention may be variously modified, and in particular, the form of a read command, and an address transformation process may be variously modified.

What is claimed is:

1. A reproduction system comprising a host apparatus and a reproduction apparatus for executing a reproduction operation with respect to a predetermined recording medium, both connected so as to mutually communicate, wherein said reproduction apparatus includes:
reproduction means for reading data from the predetermined recording medium; and
reproduction control means for causing said reproduction means to read defect management information recorded in the recording medium in accordance with a command from said host apparatus before transmitting the reproduced defect management information to said host apparatus, and causing said reproduction means to execute a reproduction operation in accordance with both a read request and reading-position information from said host apparatus before transmitting the reproduced data to said host apparatus, and wherein said host apparatus includes:
defect management means for holding the defect management information supplied from said reproduction apparatus; and
reproduction request means for commanding said reproduction apparatus to read the defect management information on the predetermined recording medium loaded into said reproduction apparatus, and transforming generated logical reading-position information to reading-position information adapted for the condition of the defect management of the predetermined recording medium by referring to the defect management information held in said defect management means before transmitting the transformed reading-position information together with a read request when said host apparatus causes said reproduction apparatus to execute the reading of data;
wherein said reproduction control means determines whether or not the defect management information is recorded on the predetermined recording medium, and when determining that the defect management information is recorded, said reproduction control means transmits the defect management information to said host apparatus in accordance with a command from said reproduction request means.

2. The system of claim 1 wherein said host apparatus is connected to said reproduction apparatus by a SCSI or a ATAPI connection.

3. The system of claim 2 wherein said recording medium is one of a DVD-ROM and a DVD-RAM.

4. The system of claim 3 wherein said defect management means includes a memory.

5. A reproduction system comprising a host apparatus and a reproduction apparatus for executing a reproduction operation with respect to a predetermined recording medium, both connected so as to mutually communicate, wherein said reproduction apparatus includes:
reproduction means for reading data from the predetermined recording medium; and
reproduction control means for causing said reproduction means to read defect management information recorded in the recording medium in accordance with a command from said host apparatus before transmitting the reproduced defect management information to said host apparatus, and causing said reproduction means to execute a reproduction operation in accordance with both a read request and reading-position information from said host apparatus before transmitting the reproduced data to said host apparatus, and wherein said host apparatus includes:

defect management means for holding the defect management information supplied from said reproduction apparatus; and reproduction request means for commanding said reproduction apparatus to read the defect management information on the predetermined recording medium loaded into said reproduction apparatus, and transforming generated logical reading-position information to reading-position information adapted for the condition of the defect management of the predetermined recording medium by referring to the defect management information held in said defect management means before transmitting the transformed reading-position information together with a read request when said host apparatus causes said reproduction apparatus to execute the reading of data; and further wherein said reproduction control means determines whether the type of the predetermined recording medium is either rewritable or used only for reproduction, and when it is determined that the type of the predetermined recording medium is rewritable, said reproduction control means transmits the defect management information to said host apparatus in accordance with a command from said reproduction request means.

6. The system of claim 5 wherein said host apparatus is connected to said reproduction apparatus by a SCSI or a ATAPI connection.

7. The system of claim 6 wherein said recording medium is one of a DVD-ROM and a DVD-RAM.

8. The system of claim 7 wherein said defect management means includes a memory.

9. A reproduction apparatus capable of executing a reproduction operation with respect to a predetermined recording medium, said reproduction apparatus connected to a host apparatus so as to mutually communicate, said reproduction apparatus comprising:

reproduction means for performing the operation of reading data from the predetermined recording medium; and reproduction control means for causing said reproduction means to execute the reading of defect management information on the predetermined recording medium in accordance with a command from said host apparatus before transmitting the reproduced defect management information to said host apparatus, and causing said reproduction means to execute a reproduction operation in accordance with a read request and reading-position information from said host apparatus before transmitting the reproduced data to said host apparatus;

wherein said reproduction control means determines whether or not defect management information is recorded on the predetermined recording medium, and when it is determined that the defect management information is recorded, said reproduction control means transmits the defect management information to said host apparatus in accordance with said read request from said host apparatus.

10. The apparatus of claim 9 wherein said host apparatus is connected to said reproduction apparatus by a SCSI or a ATAPI connection.

11. The apparatus of claim 10 wherein said recording medium is one of a DVD-ROM and a DVD-RAM.

12. A reproduction apparatus capable of executing a reproduction operation with respect to a predetermined recording medium, said reproduction apparatus connected to a host apparatus so as to mutually communicate, said reproduction apparatus comprising:

reproduction means for performing the operation of reading data from the predetermined recording medium; and reproduction control means for causing said reproduction means to execute the reading of defect management information on the predetermined recording medium in accordance with a command from said host apparatus before transmitting the reproduced defect management information to said host apparatus, and causing said reproduction means to execute a reproduction operation in accordance with a read request and reading-position information from said host apparatus before transmitting the reproduced data to said host apparatus;

wherein said reproduction control means determines whether the type of the predetermined recording medium is either rewritable or used for only reproduction, and when it is determined that the type of the predetermined recording medium is rewritable, said reproduction control means transmits the defect management information to said host apparatus in accordance with said read request from said host apparatus.

13. The apparatus of claim 12 wherein said host apparatus is connected to said reproduction apparatus by a SCSI or a ATAPI connection.

14. The apparatus of claim 13 wherein said recording medium is one of a DVD-ROM and a DVD-RAM.

15. A reproduction method employed in a reproduction system including a host apparatus and a reproduction apparatus both connected so as to mutually communicate for executing a data reproduction operation with respect to a predetermined recording medium, both connected so as to mutually communicate, said reproduction method comprising the steps of:

transmitting read defect management information in the predetermined recording medium loaded into said reproduction apparatus to said host apparatus;

transforming generated logical reading-position information as a position to be read to reading-position information adapted for the condition of the defect management of the predetermined recording medium, based on the defect management information supplied to said host apparatus;

requesting said reproduction apparatus to reproduce data from the predetermined recording medium loaded into said reproduction apparatus; and holding the reading-position information obtained by transforming the generated logical reading-position information as a location to be read in accordance with the condition of the defect management of the predetermined recording medium before the step of requesting said reproduction apparatus to reproduce data is performed.

16. The method of claim 15 wherein said host apparatus is connected to said reproduction apparatus by a SCSI or a ATAPI connection.

17. The method of claim 16 wherein said recording medium is one of a DVD-ROM and a DVD-RAM.

18. The system of claim 16 wherein said host apparatus is connected to said reproduction apparatus by a SCSI or a ATAPI connection.

19. The system of claim 17 wherein said recording medium is one of a DVD-ROM and a DVD-RAM.

20. A reproduction system comprising a host apparatus and a reproduction apparatus for executing a reproduction operation with respect to a predetermined recording medium, both connected so as to mutually communicate,
wherein said reproduction apparatus includes:
a disc driving unit for reading data from the predetermined recording medium; and
a controller for causing said disc driving unit to read defect management information recorded in the recording medium in accordance with a command from said host apparatus before transmitting the reproduced defect management information to said host apparatus, and causing said disc driving unit to execute a reproduction operation in accordance with both a read request and reading-position information from said host apparatus before transmitting the reproduced data to said host apparatus, and wherein said host apparatus includes:
a memory for holding the defect management information supplied from said reproduction apparatus; and
a device driver for commanding said reproduction apparatus to read the defect management information on the predetermined recording medium loaded into said reproduction apparatus, and transforming generated logical reading-position information to reading-position information adapted for the condition of the defect management of the predetermined recording medium by referring to the defect management information held in said memory before transmitting the transformed reading-position information together with a read request when said host apparatus causes said reproduction apparatus to execute the reading of data;
wherein said controller determines whether or not the defect management information is recorded on the predetermined recording medium, and when determining that the defect management information is recorded, said controller transmits the defect management information to said host apparatus in accordance with a command from said device driver.

21. The system of claim 20 wherein said device driver is configured to operate under an operating system.

22. A reproduction system comprising a host apparatus and a reproduction apparatus for executing a reproduction operation with respect to a predetermined recording medium, both connected so as to mutually communicate,
wherein said reproduction apparatus includes:
a disc driving unit for reading data from the predetermined recording medium; and
a controller for causing said disc driving unit to read defect management information recorded in the recording medium in accordance with a command from said host apparatus before transmitting the reproduced defect management information to said host apparatus, and causing said disc driving unit to execute a reproduction operation in accordance with both a read request and reading-position information from said host apparatus before transmitting the reproduced data to said host apparatus, and wherein said host apparatus includes:
a memory for holding the defect management information supplied from said reproduction apparatus; and
a device driver for commanding said reproduction apparatus to read the defect management information on the predetermined recording medium loaded into said reproduction apparatus, and transforming generated logical reading-position information to reading-position information adapted for the condition of the defect management of the predetermined recording medium by referring to the defect management information held in said memory before transmitting the transformed reading-position information together with a read request when said host apparatus causes said reproduction apparatus to execute the reading of data; and further
wherein said controller determines whether the type of the predetermined recording medium is either rewritable or used only for reproduction, and when it is determined that the type of the predetermined recording medium is rewritable, said controller transmits the defect management information to said host apparatus in accordance with a command from said device driver.

23. The system of claim 22 wherein said host apparatus is connected to said reproduction apparatus by a SCSI or a ATAPI connection.

24. The system of claim 23 wherein said recording medium is one of a DVD-ROM and a DVD-RAM.

25. The system of claim 24 wherein said device driver is configured to operate under an operating system.

26. A reproduction apparatus capable of executing a reproduction operation with respect to a predetermined recording medium, said reproduction apparatus connected to a host apparatus so as to mutually communicate, said reproduction apparatus comprising:
a disc driving unit for performing the operation of reading data from the predetermined recording medium; and
a controller for causing said disc driving unit to execute the reading of defect management information on the predetermined recording medium in accordance with a command from said host apparatus before transmitting the reproduced defect management information to said host apparatus, and causing said disc driving unit to execute a reproduction operation in accordance with a read request and reading-position information from said host apparatus before transmitting the reproduced data to said host apparatus;
wherein said controller determines whether or not defect management information is recorded on the predetermined recording medium, and when it is determined that the defect management information is recorded, said controller transmits the defect management information to said host apparatus in accordance with said read request from said host apparatus.

27. The system of claim 26 wherein said host apparatus is connected to said reproduction apparatus by a SCSI or a ATAPI connection.

28. The system of claim 27 wherein said recording medium is one of a DVD-ROM and a DVD-RAM.

29. A reproduction apparatus capable of executing a reproduction operation with respect to a predetermined recording medium, said reproduction apparatus connected to a host apparatus so as to mutually communicate, said reproduction apparatus comprising:

a disc driving unit for performing the operation of reading data from the predetermined recording medium; and a controller for causing said disc driving unit to execute the reading of defect management information on the predetermined recording medium in accordance with a command from said host apparatus before transmitting the reproduced defect management information to said host apparatus, and causing said disc driving unit to execute a reproduction operation in accordance with a read request and reading-position information from said host apparatus before transmitting the reproduced data to said host apparatus;

wherein said controller determines whether the type of the predetermined recording medium is either rewritable or used for only reproduction, and when it is determined that the type of the predetermined recording medium is rewritable, said controller transmits the defect management information to said host apparatus in accordance with said read request from said host apparatus.

30. The system of claim 29 wherein said host apparatus is connected to said reproduction apparatus by a SCSI or a ATAPI connection.

31. The system of claim 30 wherein said recording medium is one of a DVD-ROM and a DVD-RAM.

* * * * *

UNITED STATES PATENT AND TRADEMARK OFFICE
CERTIFICATE OF CORRECTION

PATENT NO. : 6,182,240 B1
DATED : January 30, 2001
INVENTOR(S) : Norichika Mine

It is certified that error appears in the above-identified patent and that said Letters Patent is hereby corrected as shown below:

Column 1,
Line 13, delete "More" and insert -- Moreover --;
Line 28, delete "," and insert -- and --.

Column 3,
Line 19, delete "that";
Line 31, delete "may";
Line 39, change "Additionally providing" to -- Additionally, providing --.

Column 6,
Line 18, delete "leading" and insert -- lead-in --;
Line 39, change "techniques" to -- technique --;
Line 59, insert -- and -- between "area" and "used".

Column 7,
Line 30, delete "dfap 1" change to -- dfaP1 --;
Line 42, delete "dfap(x)" change to -- dfaP(x) --;
Line 43, delete "when" change to -- where --;
Line 60, delete "dfas1" change -- dfaS1 --;
Line 67, change "replacement" to -- "replacement," -- and delete "," after "which".

Column 8,
Line 5, change "byte" to -- bytes --.

Column 12,
Line 9, change "behind" to -- after --;
Line 57, change "cases" to -- cases: --.

UNITED STATES PATENT AND TRADEMARK OFFICE
CERTIFICATE OF CORRECTION

PATENT NO. : 6,182,240 B1
DATED : January 30, 2001
INVENTOR(S) : Norichika Mine

It is certified that error appears in the above-identified patent and that said Letters Patent is hereby corrected as shown below:

<u>Column 13,</u>
Line 61, change (second occurance) "16Y-2"; to -- 16Y-1 --.

<u>Column 14,</u>
Line 54, change "16Y1" to -- 16Y-1 --.

<u>Column 15,</u>
Line 41, change "2 in" to -- 2. capitalize "I" in In --.

Signed and Sealed this

Fifth Day of March, 2002

*Attest:*

*Attesting Officer*

JAMES E. ROGAN
*Director of the United States Patent and Trademark Office*